United States Patent [19]

Turvy

[11] Patent Number: 5,379,403
[45] Date of Patent: Jan. 3, 1995

[54] METHOD AND INTERFACE ADAPTER FOR INTERFACING AN ISA BOARD TO AN MCA SYSTEM BY THE ISSUANCE OF AN ILLINI-CDCHRDY SIGNAL FROM THE INTERFACE ADAPTER

[75] Inventor: Elizabeth A. Turvy, Buford, Ga.

[73] Assignee: NCR Corporation, Dayton, Ohio

[21] Appl. No.: 983,500

[22] Filed: Nov. 27, 1992

[51] Int. Cl.⁶ .................. G06F 3/00; G06F 13/00
[52] U.S. Cl. .................. 395/500; 395/550;
  364/228; 364/229; 364/239; 364/239.1;
  364/239.9; 364/DIG. 1
[58] Field of Search .......... 395/500, 550, 250, 325;
  364/DIG. 1

[56] References Cited

U.S. PATENT DOCUMENTS

| | | | |
|---|---|---|---|
| 4,908,749 | 3/1990 | Marshall et al. | 395/325 |
| 4,984,213 | 1/1991 | Abdoo et al. | 365/230.03 |
| 4,991,085 | 2/1991 | Pleva et al. | 395/275 |
| 5,043,877 | 8/1991 | Berger et al. | 395/325 |
| 5,117,486 | 5/1992 | Clark et al. | 395/250 |
| 5,191,657 | 3/1993 | Ludwig et al. | 395/325 |
| 5,237,676 | 8/1993 | Arimilli et al. | 395/550 |
| 5,317,721 | 5/1994 | Robinson | 395/500 |

Primary Examiner—Alyssa H. Bowler
Assistant Examiner—Meng-Ai T. An
Attorney, Agent, or Firm—Elmer Wargo

[57] ABSTRACT

A method and apparatus for interfacing an Industry Standards Architecture board (ISA board) to a Micro Channel System (MCA system) to enable a first signal (IOCHRDY) from the ISA board to complete data transfer to the MCA system in response to a first signal (Cmd_Act_) from the MCA system. An interface board issues an ILLINI-CDCHRDY signal earlier than the first signal from the ISA board and keeps this signal active until the first signal from the ISA board becomes active.

4 Claims, 3 Drawing Sheets

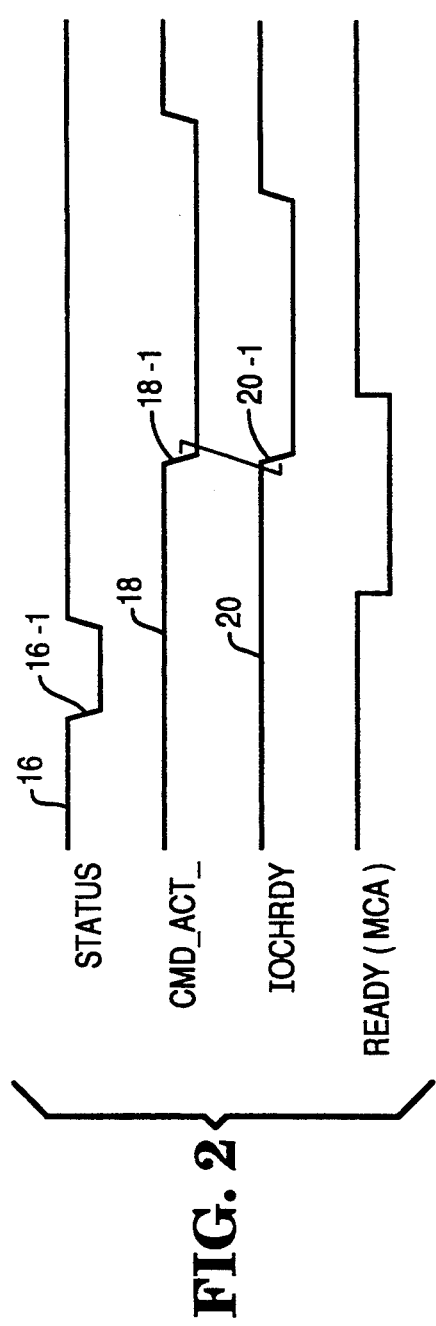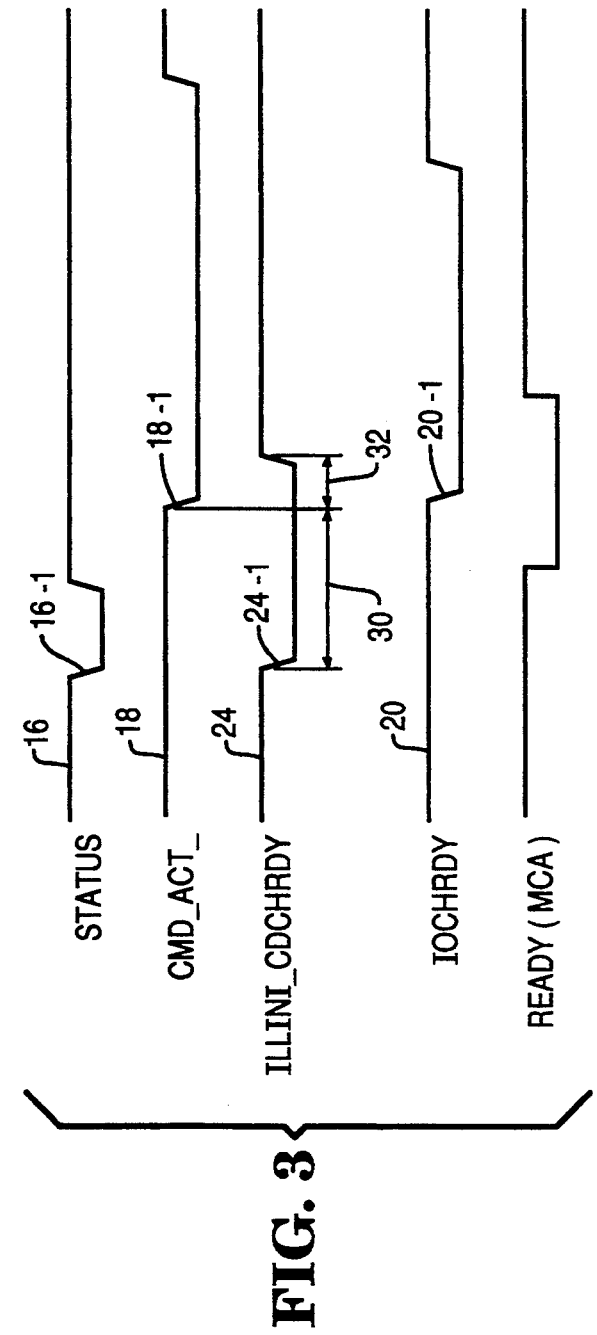

METHOD AND INTERFACE ADAPTER FOR INTERFACING AN ISA BOARD TO AN MCA SYSTEM BY THE ISSUANCE OF AN ILLINI-CDCHRDY SIGNAL FROM THE INTERFACE ADAPTER

BACKGROUND OF THE INVENTION

1. Field of Invention

This invention relates to a method and adapter for interfacing a printed circuit board designed for an ISA bus architecture to an MCA system.

2. Background Information

Personal computers presently have at least two general types of architectures. A first type is the Industry Standards Architecture (ISA), and a second type is generally referred to as Micro Channel Architecture (MCA). These two types of architectures are used as "platforms" for some business equipment machines, like banking or financial machines, for example. In some situations, it is necessary that these types of architectures be interfaced with each other.

In the development of business equipment machines, for example, it is necessary that a specific circuit be designed for a particular application. This circuit is referred to an Application Specific Integrated Circuit (ASIC). When such an ASIC is designed for an ISA unit, and then is interfaced with an MCA unit, it is conceivable that the interfacing does not meet the timing requirements of the MCA unit.

SUMMARY OF THE INVENTION

An object of this invention is to interface an ASIC design of the type mentioned to an MCA system.

Another object of this invention is to provide an interface of the type mentioned that is low in cost.

A preferred method of this invention relates to a method of interfacing an Industry Standards Architecture board (hereinafter referred to as an ISA board) to a Micro Channel System (hereinafter referred to as an MCA system) to enable a first signal (IOCHRDY) from the ISA board to complete data transfer to said MCA system in response to a first signal (Cmd_Act_) from said MCA system, said method comprising the steps of:
  (a) issuing a first signal (ILLINI_CDCHRDY) from an interface which responds to a second signal (Status) from said MCA system;
  (b) keeping said first signal (ILLINI_CDCHRDY) from said interface at an active level during a time when said first signal (Cmd_Act_) from said MCA system is active; and
  (c) keeping said first signal (ILLINI_CDCHRDY) from said interface at an active level until said first signal (IOCHRDY) from said ISA board becomes active to complete the data transfer to said MCA system.

In another aspect of this invention, there is provided a system comprising:
  a Micro Channel System (hereinafter referred to as an MCA system) which operates in response to a CDCHRDY signal;
  an Industrial Standards Architecture board (hereinafter referred to as an ISA board) in which the CDCHRDY signal is not pulled low until after a CMD_Act_ signal from the MCA system is active; and
  an interface having logic to:
  (a) issue a first signal (ILLINI_CDCHRDY signal) which responds to a Status signal from said MCA system;
  (b) keep said first signal at an active level during the time that the CMD_ACT signal from the MCA system becomes active; and
  (c) keep said first signal at an active level until the CDCHRDY signal becomes active to complete data transfer to said MCA system.

BRIEF DESCRIPTION OF THE DRAWING

FIG. 2 shows several waveforms which illustrate a problem which is solved by this invention.

FIG. 3 shows several waveforms associated with the interface shown in FIG. 1.

DETAILED DESCRIPTION OF THE PREFERRED EMBODIMENT

Figure 1:
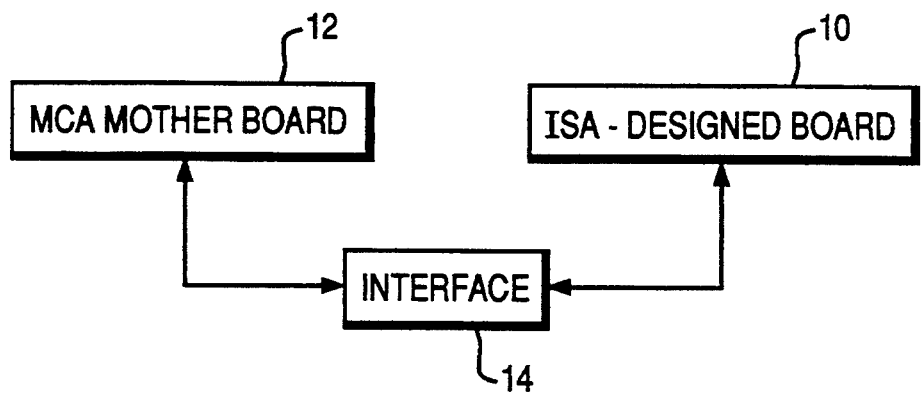
FIG. 1 is a general schematic diagram showing an ISA designed board being interfaced with an MCA motherboard, with the interface being made according to this invention..

FIG. 1 is a general schematic diagram showing an ISA-designed board, hereinafter called board 10, which is coupled to an MCA motherboard, hereinafter called motherboard 12, by an interface circuit 14 which is made according to this invention. In particular, the board 10 could not pull the signal CDCHRDY in time to meet the Microchannel specification. Before discussing this problem in further detail, some background information is useful.

Some of the differences between the PC, XT, and AT systems and the MCA systems are as follows:

1. The PC XT, and AT systems use dip switches and jumper cables to select features.
2. The MCA systems use programmable option select (POS) features which are implemented in registers. There could be eight registers, with each register having eight bits.
3. Each adapter card designed for an MCA bus must contain some or all of the POS registers; and
4. PC, XT, and AT systems require decoded command signals, while the MCA systems require coded signals.

While transferring data, if an adapter board needs more time to transfer data on an MCA bus, the adapter board asks for an extended cycle. In this regard, an MCA bus supports two types of extended cycles. These extended cycles are:

1. Asynchronous Extended; and
2. Synchronous Extended.

Some of the differences between the two types of extended cycles are as follows.

1. For Asynchronous Extended, the signal CDCHRDY is removed by the adapter at any time after the falling edge of the signal CMD.
2. For Synchronous Extended, the signal CDCHRDY is removed synchronously within 30 nanoseconds of the falling edge of the signal CMD.

The IBM Micro Channel Architecture defines an Asynchronous Extended Cycle based on the sense of the signal CDCHRDY and the length of the time that it is pulled low. For an Asynchronous Extended, the signal CDCHRDY is pulled low based on unlatched status and address, and this CDCHRDY signal is pulled low some time before the signal CMD_ is low. The signal CDCHRDY must be pulled low 60 nanoseconds after unlatched addresses and status are valid. The signal CDCHRDY remains low depending upon the amount of time that an Adapter needs to complete the cycle. If the Adapter takes the responsibility of controlling the signal CDCHRDY for accesses to its address range, the Adapter will also be able to define the cycle length needed. In an ISA design, the signal CDCHRDY is not pulled low until the command signal CMD is detected active. This is too late for the MCA system to recognize the cycle as an Extended cycle.

In general, there are three types of cycles used for completing MCA activity. They are:
1. Default which takes 200 nanoseconds.
2. Synchronous extended which takes 300 nanoseconds; and
3. Asynchronous extended which can be a very short time or a very long time depending upon the requirements of the board or adapter completing the operation.

The ISA adapters and the ASIC adapters (or ASIC in this instance) are designed to know how much time that each one needs to complete an operation.

FIG. 2 shows a problem which may exist when a board which was designed for the ISA architecture is interfaced with an MCA motherboard. FIG. 2 shows waveforms associated with the interfacing between the two architectures mentioned. These waveforms are as follows:
1. Waveform 16 shows a Status signal coming from an MCA Motherboard, like the motherboard 12, with this signal becoming active at 16-1.
2. Waveform 18 shows the Cmd_₁ Act_ signal, coming from the motherboard 12, with this signal becoming active at 18-1.
3. Waveform 20 shows the "IOCHRDY" coming from an ISA-Designed circuit, with this signal becoming active at 20-1.

As previously stated, the problem presented by the MCA specifications is that the "IOCHRDY" signal is required to be low or active after the Status signal is active but before the Cmd_ Act_ signal goes low or active. Notice from FIG. 2 that the "IOCHRDY" signal goes low at the same time that the Cmd_ Act_ signal goes low instead of going low before the Cmd_ Act signal goes low.

Figure 4:
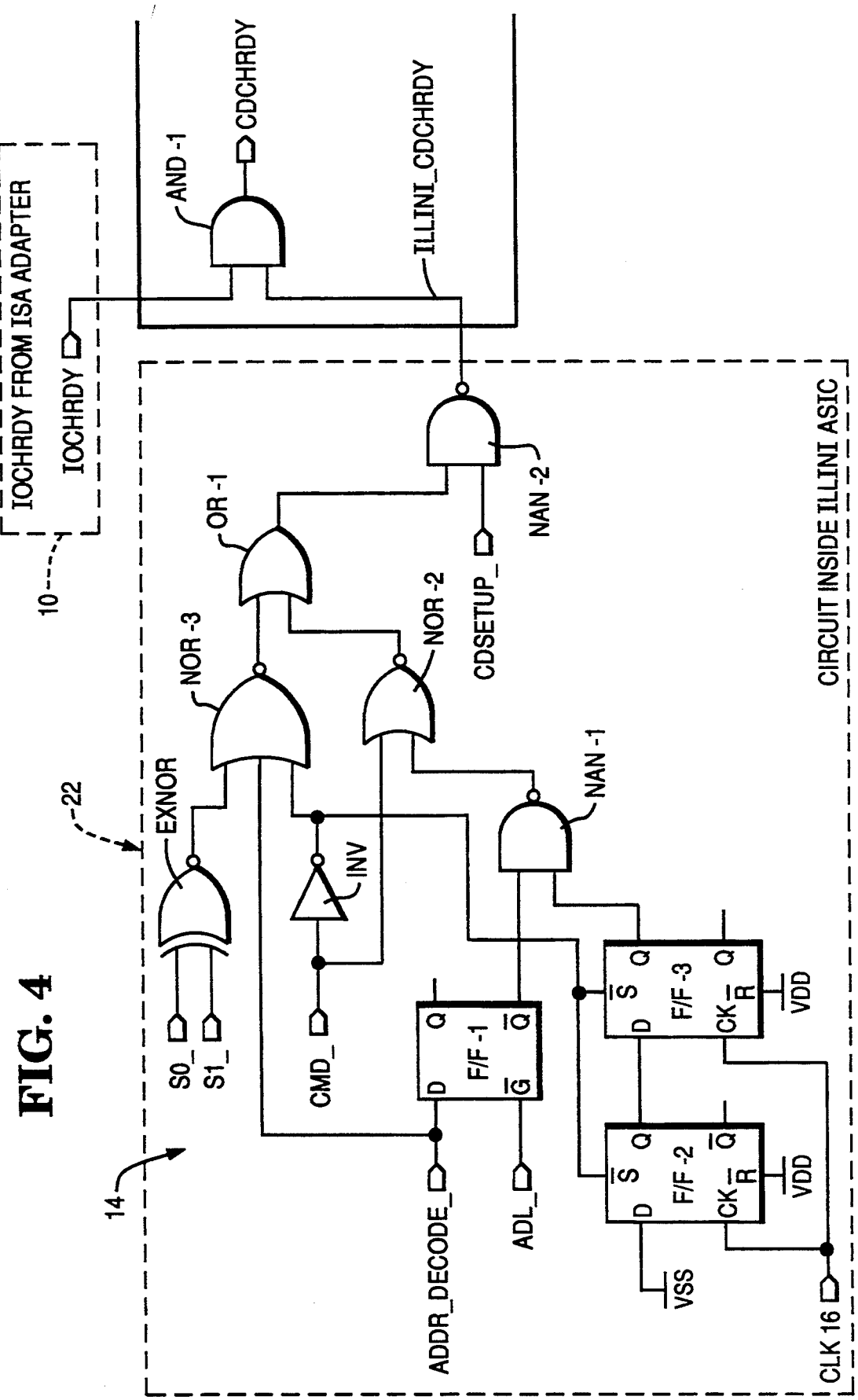
FIG. 4 is a schematic diagram of the interface shown in FIG. 1.

FIG. 3 shows the various waveforms included in FIG. 2, and FIG. 3 also shows another waveform, ILLINI_ CDCHRDY, which is generated by the interface 14 shown in more detail in FIG. 4. The circuit or the interface 14 is shown within the dashed rectangle 22. The ILLINI_CDCHRDY signal is used to "pull" the CDCHRDY signal to start the cycle as an Asynchronous Extended. The ILLINI_CDCHRDY signal, shown as waveform 24 becomes active (negative as shown at area 24-1) after the status signal becomes active at area 16-1. The ILLINI_CDCHRDY signal remains active or low long enough to enable the true IOCHRDY, coming from the board 10, to become active, as shown at 20-1. The ILLINI_CDCHRDY and IOCHRDY signals are combined by the interface 14, as will be described hereinafter, and the board 10 determines the extent of duration of the Asynchronous Extended cycle as it was supposed to do. In other words, the ILLINI_CDCHRDY signal coming from the interface 14 and the regular IOCHRDY signal coming from the board 10 are combined by the interface 14 and presented to the Micro Channel of the motherboard 12 as one CDCHRDY signal for the Asynchronous Extended slot.

Figure 5:
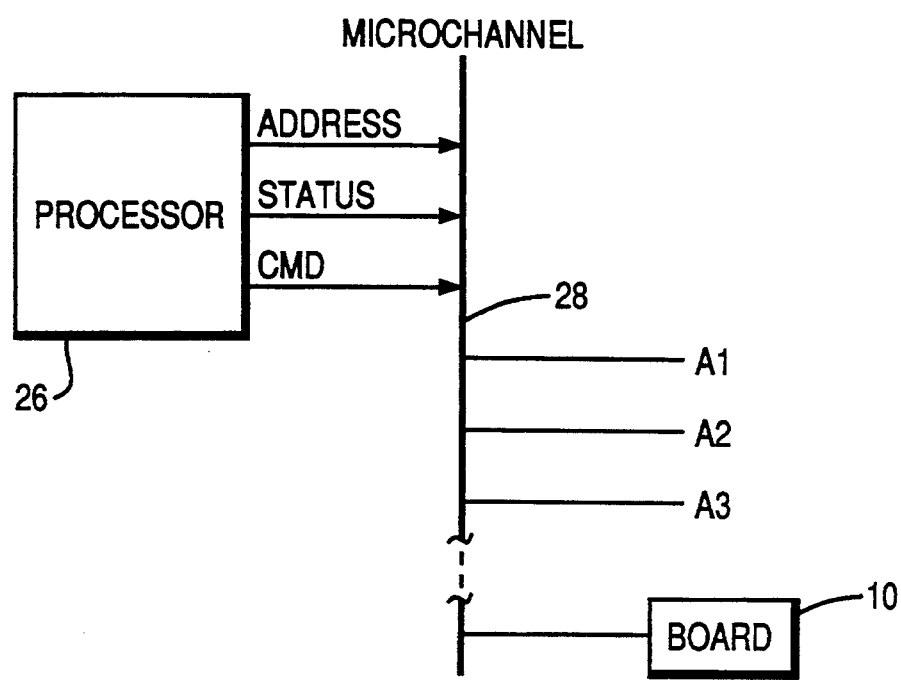
FIG. 5 (shown on the sheet with FIG. 1) is a schematic diagram showing a processor included on the MCA motherboard shown in FIG. 1.

FIG. 5 shows a processor 26 and microchannel associated with the motherboard 12 shown in FIG. 1. Some of the signals coming from the processor 26 are shown in FIG. 5. There are several adapters like A1, A2, and A3 coupled to the microchannel 28 in addition to the board 10 previously mentioned.

The following definitions relate to signals which are associated with the interface 14 shown in FIG. 4.
1. CDSETUP_ (generated by the motherboard 12) is an active low card setup indicator.
2. ADL_ (generated by the motherboard 12) is an active low signal to latch valid address and status signals.
3. CMD_ (generated by the motherboard 12) is an active low command signal.
4. CDCHRDY (generated by the board 10) when high indicates "ready". Low indicates "not ready" and extends the cycle length. This signal must be active 60 nanoseconds after unlatched status and addresses.
5. IOCHRDY (generated by the board 10) indicates "ready" when high and "not ready" when low. This signal is valid after CMD_ is active.
6. CLK16 is a 16 MHz clock.
7. ADDR_DECODE (generated by the interface 14) is an active low general purpose decode signal determining address range.

Some additional comments about the signals #1–#7 mentioned above appear appropriate.

With regard to signal #1, this signal is used to indicate to which of the adapters the information is to go. The reason that this signal is used is that we do not want to pull the CDCHRDY signal to a low level whenever the signal #1 is active.

With regard to signal #3, this signal is active whenever a read or a write cycle is to be effected. The signals marked S0_ and S1_ are used conventionally for this purpose.

With regard to signal #5, this signal is a ready line coming from one of the adapters shown in FIG. 5 and goes to the microchannel 28.

With regard to signal #6, this is a standard clock signal.

With regard to signal #7, this signal comes from the interface 14 shown in FIG. 4.

On power up of the interface 14 (FIG. 5), the following signals mentioned above are not active:
1 CDSETUP,
3 CMD_,
5 IOCHRDY, and
7 ADDR_DECODE.

These signals mentioned in this paragraph, and signal ADL_ are all shown in FIG. 4, and all these signals are high on power up. These signals mentioned propagate through the interface 14 and cause the output of gate AND-1 to go high. This means that the adapter or the board 10 is ready to respond to an asynchronous extended cycle.

As previously stated the interface 14, shown within the dashed rectangle 22, is located on the motherboard 12. Assume that a write or read cycle is to be effected. For a write cycle, S1 is high and S0 is low, for example; for a read cycle, these values are reversed. At this time,

1 CDSETUP, #3 CMD_, #5 IOCHRDY, and #7 ADDR_DECODE signal shown in FIG. 4 are at a high level. These signals just mentioned propagate through the interface 14 to produce a high level output from the AND gate 1 (designated as AND-1 in FIG. 4). When the output of the AND gate 1 falls to a low or active level, it means that the board 10 is requesting an asynchronous extend time from the motherboard 12.

A cycle begins with valid status and address signals causing the EXNOR gate (FIG. 4) output to go low and propagating a high from NOR 3 to a low from AND-1. At the same time, an ADL signal from the motherboard 12 goes to a low or active level causing the Q/ (read as Q Bar) output of the flip flop 1 (designated as FF-1 in FIG. 4) to go to a high level. The Q outputs of the flip flops FF-2 and FF-3 remain at high levels at this time. With two high level signals coming at this time into the NAND gate 1 (designated as NAN-1), the output thereof falls to a low level. Then CMD_ goes low. The low level from NAND gate 1 propagates through NOR gate 2, the OR gate 1, and the NAND gate 1 to the AND gate 1 to hold the output to a low level. The time interval shown by double arrow 30 in FIG. 3 relates to the time interval that the CDCHRDY signal from AND gate 1 is at a low level due to the NOR gate 3 rising to a high level.

As stated previously with regard to FIG. 2, the signal IOCHRDY (waveform 20) is required low by the MCA Specification after the Status (waveform 16) signal is valid but before the signal CMD_ACT_ (waveform 18) goes low are active. As shown in FIG. 3, after the signal CMD_ACT goes low, the output of the inverter (INV) causes a counting circuit including the flip flops FF-2 and FF-3 to start counting while being fed clock pulses from the clock shown in FIG. 4. In the embodiment described, a delay of 62.5 nanoseconds (represented by double arrow 32 in FIG. 3) is generated by the flip flops FF-2 and FF-3 before the Q output of the flip flop FF-3 falls to a low level. The Q output from flip flop FF-3 propagates through the NAND gate 1, the NOR gate 2, the OR gate 2, and the AND gate 1, causing the signal at the output of the AND gate 1 to rise to a high level. What happens is that the high level IOCHRDY signal coming from the adapter board 10 and the high level coming from the NAND gate 2 combine to produce a high level CDCHRY signal from the output of the AND gate 2 to indicate ready condition.

As an aside, the Ready signal shown in FIGS. 2 and 3 falls after the Status signal rises, and the Ready signal remains low until after the Cmd_Act_ signal becomes active by falling to a low level. The Ready signal remains high until another request for the MC channel 28 is made. When one of the adapters, like A1, A2, etc. shown in FIG. 5, recognizes its address on the MC channel 28, it will pull the Ready signal to a low level. The Ready signal occurs after the Status signal (waveform 16) and before the Cmd_Act_. The ISA board 10 is different in that the Ready signal occurs after the Cmd_Act_ signal.

The method of this invention can be summarized in claim-like language as follows. This invention relates to a method of interfacing an Industry Standards Architecture board (hereinafter referred to as an ISA board) to a Micro Channel System (hereinafter referred to as an MCA system) to enable a first signal (IOCHRDY) from the ISA board to complete data transfer to said MCA system in response to a first signal (Cmd_Act_) from said MCA system, said method comprising the steps of:

(a) issuing a first signal (ILLINI_CDCHRDY) from an interface which responds to a second signal (Status) from said MCA system;

(b) keeping said first signal (ILLINI_CDCHRDY) from said interface at an active level during a time when said first signal (Cmd_Act_) from said MCA system is active; and (c) keeping said first signal (ILLINI_CDCHRDY) from said interface at an active level until said first signal (IOCHRDY) from said ISA board becomes active to complete the data transfer to said MCA system.

What is claimed is:

1. A method of interfacing an Industry Standards Architecture board (hereinafter referred to as an ISA board) to a Micro Channel System (hereinafter referred to as an MCA system) to enable a first signal (IOCHRDY) from the ISA board to initiate data transfer to said MCA system in response to said first signal (Cmd_Act_) from said MCA system, said interfacing solving a timing problem in which the first signal (IOCHRDY) from the ISA board and the first signal Cmd_Act_ from said MCA system occur at the same time, said method comprising the steps of:

(a) issuing a first signal (ILLINI_CDCHRDY) from an interface located between said ISA board and said MCA system which responds to a second signal (Status) from said MCA system;

(b) keeping said first signal (ILLINI_CDCHRDY) from said interface at an active level during a time when said first signal (Cmd_Act_) from said MCA system is active, with said first signal (ILLINI_CDCHRDY) from said interface occurring after said second signal (Status) from said MCA system but before said first signal (Cmd_Act_) from said MCA system; and (c) keeping said first signal (ILLINI_CDCHRDY) from said interface at an active level until said first signal (IOCHRDY) from said ISA board becomes active to initiate the data transfer to said MCA system.

2. The method as claimed in claim 1 in which said keeping step (c) is effected by gating said first signal (ILLINI_CDCHRDY) from said interface and said first signal (IOCHCRDY) from said ISA board.

3. An interface for interfacing an Industry Standards Architecture board (hereinafter referred to as an ISA board) to a Micro Channel System (hereinafter referred to as an MCA system) to enable a first signal (IOCHRDY) from the ISA board to initiate data transfer to said MCA system in response to a first signal (Cmd_Act_) from said MCA system, said interface being located between said ISA board and said MCA system and said interface solving a timing problem in which the first signal (IOCHRDY) from the ISA board and the first signal Cmd_Act_ from said MCA system occur at the same time, said interface comprising:

(a) means for issuing a first signal (ILLINI_CDCHRDY) which responds to a second signal (Status) from said MCA system;

(b) means for keeping said first signal (ILLINI_CDCHRDY) at an active level during a time when said first signal (Cmd_Act_) from said MCA system is active, with said first signal (ILLINI_CDCHRDY) from said interface occurring after said second signal (Status) from said MCA system but before said first signal (Cmd_Act_) from said MCA system; and (c) means for keeping said first signal (ILLINI_CDCHRDY) signal at an active level until said first signal (IOCHRDY) from said ISA board becomes active to initiate the data transfer to said MCA system.

4. A system comprising:

a Micro Channel System (hereinafter referred to as an MCA system) which operates according to an MCA specification which requires that a CDCHRDY signal coming from an adapter board become active after a Status signal from the MCA system becomes active but before a Cmd_Act_ signal from the MCA system becomes active;

an Industrial Standards Architecture board (hereinafter referred to as an ISA board) in which the CDCHRDY signal is not active before the Cmd_Act_ signal from the MCA system is active; and an interface having logic to:
(a) issue a first signal (ILLINI_CDCHRDY) which responds to the Status signal from said MCA system;
(b) keep said first signal (ILLINI_CDCHRDY) at an active level during a time when the Cmd_Act_ signal from the MCA system becomes active; and
(c) keep said first signal (ILLINI_CDCHRDY) at an active level and to combine said first signal (ILLINI_CDCHRDY) with the IOCHRDY signal coming from the ISA board and to present one CDCHRDY signal to said MCA system for an Asynchronous Extended Slot.

* * * * *